United States Patent
Na et al.

(10) Patent No.: US 7,646,773 B2
(45) Date of Patent: Jan. 12, 2010

(54) FORWARDING DATABASE IN A NETWORK SWITCH DEVICE

(75) Inventors: Jing Na, San Jose, CA (US); Michael Yip, Sunnyvale, CA (US); Yeeping Zhong, Milpitas, CA (US)

(73) Assignee: Extreme Networks, Santa Clara, CA (US)

( * ) Notice: Subject to any disclaimer, the term of this patent is extended or adjusted under 35 U.S.C. 154(b) by 891 days.

(21) Appl. No.: 10/911,156

(22) Filed: Aug. 2, 2004

(65) Prior Publication Data

US 2006/0023724 A1    Feb. 2, 2006

(51) Int. Cl.
*H04L 12/28* (2006.01)
(52) U.S. Cl. .................................. 370/395.31
(58) Field of Classification Search ............ 370/395.53, 370/250, 395.3, 256, 299, 400, 392, 395.31, 370/395.32, 399, 408, 428, 351, 465, 474, 370/229, 230, 252; 707/101
See application file for complete search history.

(56) References Cited

U.S. PATENT DOCUMENTS

| | | | | |
|---|---|---|---|---|
| RE32,327 E | * | 1/1987 | Biba et al. ................... | 370/445 |
| 6,023,563 A | * | 2/2000 | Shani .......................... | 709/249 |
| 6,192,051 B1 | * | 2/2001 | Lipman et al. ............... | 370/389 |
| 6,343,078 B1 | | 1/2002 | Bronstein et al. | |
| 6,661,787 B1 | * | 12/2003 | O'Connell et al. .......... | 370/389 |
| 6,683,882 B1 | * | 1/2004 | Maufer et al. ............... | 370/401 |
| 6,807,179 B1 | * | 10/2004 | Kanuri et al. ........... | 370/395.31 |
| 7,016,911 B2 | * | 3/2006 | Bousfield et al. ............ | 707/101 |
| 2001/0028651 A1 | * | 10/2001 | Murase ........................ | 370/392 |
| 2002/0133619 A1 | * | 9/2002 | Lin et al. ..................... | 709/238 |
| 2003/0214956 A1 | | 11/2003 | Navada et al. | |
| 2004/0193619 A1 | * | 9/2004 | Venkatachary et al. ...... | 707/100 |

* cited by examiner

*Primary Examiner*—Kwang B Yao
*Assistant Examiner*—Anh Ngoc Nguyen
(74) *Attorney, Agent, or Firm*—Blakely Sokoloff Tayor & Zafman (57) ABSTRACT

A layer-2 network switch device forwarding database implementation and method to access the forwarding database. A forwarding database (FDB) is implemented as a tree. A separate VLAN database is also structured as a tree. Each node in the tree represents a separate VLAN. For each VLAN, all associated ports are maintained in a data structure organized as a tree. Likewise, all port information is maintained in a tree-based data structure, and for each port, all VLAN information associated with the port is maintained in a tree data structure. Each node in a VLAN's port tree data structure is linked with each corresponding node in the port's VLAN tree data structure. Each pair of nodes maintains a linked list of all FDB entries relating to the node pair. Operations are quickly and efficiently performed on the FDB using the data structure architecture.

15 Claims, 5 Drawing Sheets

FIG. 1

| FDB TREE 100 | 120 | 130 | 140 |
|---|---|---|---|
| MAC ADDR (110) | VLAN INSTANCE | EGRESS PORT | VLAN_PORT LINK |
| 0XFFFFFFFFFFFF (111) | V1 | P1, P3 | 411, 412 |
| 0X000011111111 (112) | V1 | P3 | 412 |
| ⋮ | | | |

FIG. 2

VLAN TREE 200

| VLAN INSTANCE (210) | PORT(S) (220) | NAME (230) |
|---|---|---|
| V1 (211) | P1, P3 | "VLAN1" |
| V2 (212) | P1, P2 | "VLAN2" |
| V3 (213) | P2, P3 | "VLAN3" |
| ⋮ | | |

FIG. 3

PORT TREE 300

| PORT (310) | VLAN(S) (320) | PORT PARAMS (330) |
|---|---|---|
| P1 (311) | V1, V2 | <PARAM1, PARAM2, ...> |
| P2 (312) | V2, V3 | ⋮ |
| P3 (313) | V1, V3 | |
| ⋮ | | |

FIG. 4

VLAN_PORT TREE 400

| VLAN (410) | PORT (420) | PTR (430) | FDB ENTRY(S) (440) |
|---|---|---|---|
| V1 (411) | P1 | NEXT | 111 |
| V1 (412) | P3 | END | 111, 112 |
| V2 (413) | P1 | NEXT | ⋮ |
| V2 (414) | P2 | END | |
| V3 (415) | P2 | NEXT | |
| V3 (416) | P3 | END | |

FORWARDING DATABASE IN A NETWORK SWITCH DEVICE

TECHNICAL FIELD

The present invention generally relates to the field of data communications. In particular, the present invention relates to implementation of a forwarding database in a network switching device, and methods for accessing and manipulating the same.

BACKGROUND

In a small network, multiple nodes, or "hosts" are connected to one single network segment and share the communications bandwidth available to that segment. However, when the amount of data traffic on the segment increases to a certain point, the network becomes congested. A network switching device/bridge can be inserted to break the network into multiple segments. By electrically and physically separating the data traffic into different segments and allowing the inter-segment data traffic to be transmitted only when necessary across the switch, the switch increases the total aggregated available communications bandwidth of the network. Typically, the switch forwards or filters (e.g., discards) inter-segment data packets using Layer-2 Media Access Control (MAC) address information obtained from a header in each of the data packets.

A switch receives data packets on each segment of the network to which one of its ports is connected and learns the location of nodes in the network by examining the source MAC address of each received data packet. Source MAC addresses may be dynamically "learned", that is, stored in a database once a packet is received that specifies the source MAC address, or may be statically configured, that is, added by a network manager to the database rather than learned. Each database entry includes, among other information, a source MAC address and a port number for the port via which the switch received the data packet specifying the source MAC address. Traditionally, this database is referred to as a Forwarding Database (FDB). The purpose of the FDB is to identify the location of each host, that is, the switch port connected to the network segment via which a data packet sourced by the host were received, so that when the switch thereafter receives a data packet specifying the host's MAC address as the destination MAC address, it searches the FDB for the MAC address and forwards the data packet to the appropriate destination host via the switch port specified in the same entry in the FDB.

Simply, a switch learns the source MAC address specified in the header of a data packet it receives by creating an entry in the FDB, the entry including the source MAC address and the port number of the port via which the packet was received. The switch also looks up in the FDB the destination MAC address specified in the header of the data packet, and forwards the packet to the appropriate switch port specified in the FDB if a matching entry is found. If no match is found then the packet is flooded to all ports on the switch in an attempt to ensure the packet reaches its destination.

Entries in the forwarding database are constantly updated and aged out (i.e., removed after a period of time) to ensure the accuracy of the database and also to keep the database as small as possible. A switch maintains, for example, an age counter, and each entry in the FDB gets time-stamped with the current value of the age counter when an entry is created. When the entry gets to a pre-defined age, the entry is removed from the FDB. This protects the FDB from stale, and over-population of unused, entries and forces the switch to re-learn source MAC addresses periodically. In order to prevent unnecessary flooding of packets due to re-learning, the FDB time-stamp associated with a particular source MAC address is updated whenever the source MAC address is detected in a received packet.

As can be appreciated, there are many operations performed on the FDB to manage the accuracy and size of its content. It is, therefore, desirable to be able to perform these operations as quickly and efficiently as possible.

SUMMARY

A forwarding database (FDB) in a network switch device is structured as a tree. MAC addresses and VLAN instance are used as keys in performing operations on the database. A separate VLAN database is also structured as a tree, wherein each node in the tree represents a separate VLAN. For each VLAN, all of the network switch device's ports configured in the VLAN are maintained in a data structure organized as a tree. Likewise, all port information is maintained in a tree-based data structure, and for each port, information regarding all VLANs associated with the port is maintained in a tree data structure. Each node in a VLAN's port tree data structure is linked with each corresponding node in the port's VLAN tree data structure. Each pair of nodes maintains a linked list that points to all FDB entries relating to the node pair. Operations are performed on the FDB using the data structure architecture.

BRIEF DESCRIPTION OF THE DRAWINGS

The present invention is illustrated by way of example, and not by way of limitation, in the figures of the accompanying drawings in which.

DETAILED DESCRIPTION

Figure 6:
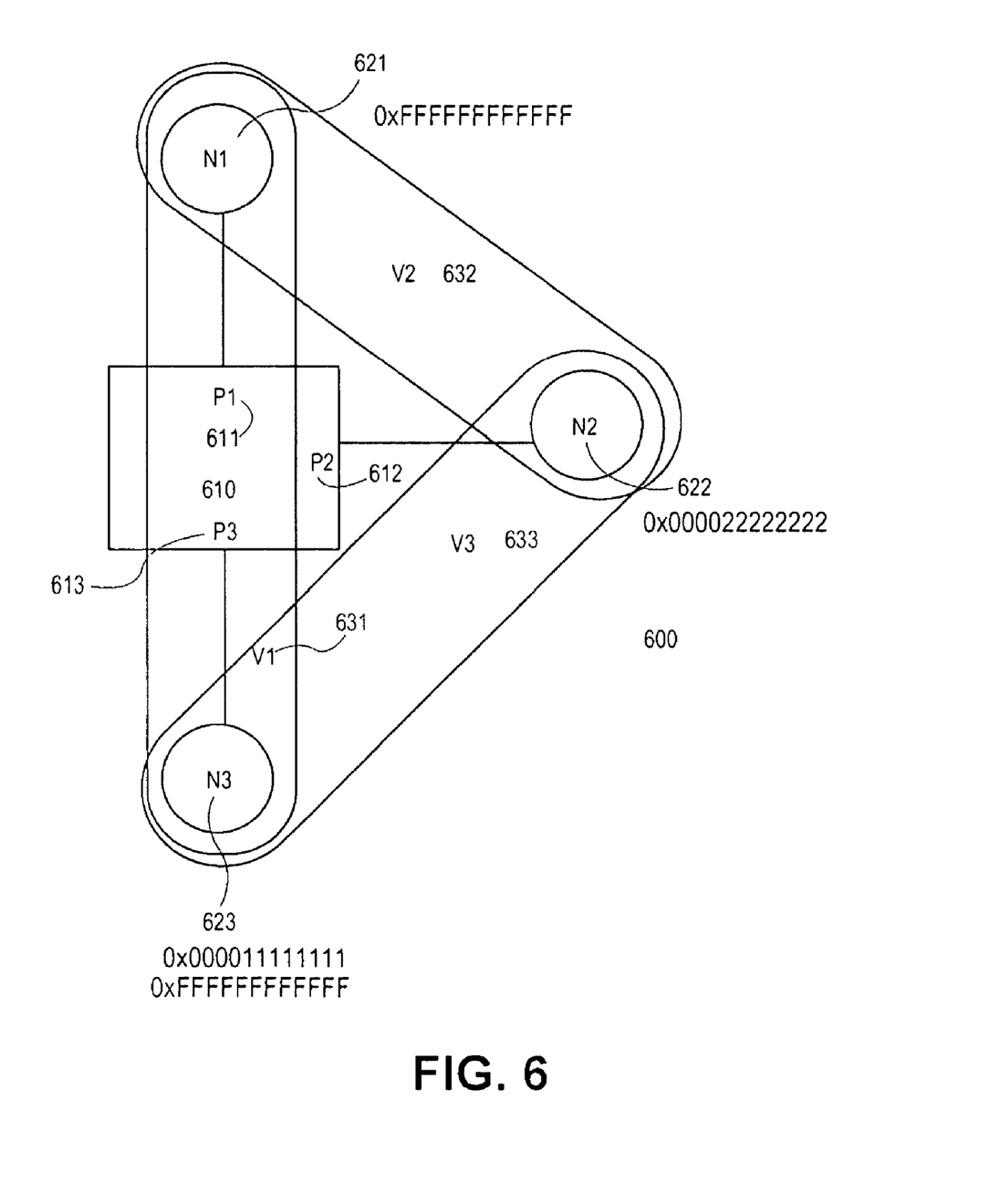
FIG. 6 provides a block diagram of a network architecture corresponding to the content of the example forwarding database and counterpart data structures illustrated in FIGS. 1-5.

FIG. 6 illustrates a network 600 simplified for the purpose of describing the invention. A layer 2 network switching device 610 ("switch 610") has multiple physical ports P1, P2 and P3, respectively referenced in the figure at 611, 612 and 613. Each port is connected via a separate network segment to a node, or host. Port P1 is connected to node N1 at 621 via a network segment, port P2 connected to node N2 at 622 via a second network segment, and port P3 connected to node N3 at 623. While the network segments are point to point segments connecting a single node to switch 610, it is appreciated that any one of the network segments may have a number of nodes connected thereto as in the case of a shared local area network (LAN) using, for example, a carrier sense, multiple access protocol such as the well known Carrier Sense Multiple Access with Collision Detection (CSMA/CD) protocol used in IEEE 802.3-based networks. A node may be a computer system, such as a personal computer, a server, or another network switching device via which yet other nodes may be reachable over an internetwork.

Each node connected to switch 610 has at least one unique hardware address that unambiguously identifies the node. For example, in FIG. 6, each node is assigned a 48-bit Media Access Control (MAC) address. N2, for example, is assigned the MAC address 0x000022222222(h), while N3 is assigned the MAC address 0x000011111111(h). In addition, multiple nodes can be assigned, or listen for data packets that specify in a destination address field thereof, a particular multicast or broadcast address. For example, both nodes N1 and N3 will listen for and accept data packets specifying a destination MAC address of 0xFFFFFFFFFFFF(h).

Network 600 has multiple virtual local area networks (VLANs). A VLAN is a logical grouping of nodes in a network, typically defined by a network administrator so that only nodes that are members of a VLAN can communicate with each other over the network, even when such nodes are otherwise reachable via an internetwork. For example, in network 600, nodes N1 and N3 are members of VLAN V1 at 631, whereas node N2 is excluded from the VLAN. Thus, nodes N1 and N2 can exchange data packets with each other via the VLAN, but not with node N3. A node can be a member of multiple VLANs. For example, node N1, in addition to being a member of V1, is also a member of VLAN V2 at 632 with node N2. N1 can communicate with N2 via VLAN V2, for example, by specifying a VLAN tag identifying VLAN V2 in data packets it sends to N2, and can communicate with N3 via VLAN V1 by specifying a VLAN tag identifying VLAN V1 in data packets it sends to N3.

VLAN membership can be configured at the network switch, for example, by associating a VLAN identifier (VLAN ID) with one or more ports. Typically, a network administrator will access and configure the network switch, mapping VLAN IDs to physical ports of the network device, via a command line interface (CLI) or graphical user interface (GUI).

Figure 1:
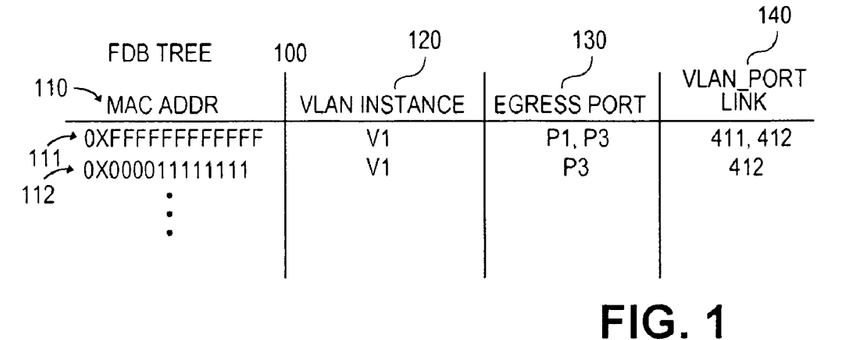
FIG. 1 illustrates a forwarding database in a network switching device in accordance with one embodiment of the invention.

FIG. 1 illustrates a portion of a data packet forwarding datastore or database (FDB) 100 that switch 610 maintains in a data storage medium accessible to the switch. Typically, switch 610 has permanent storage capabilities, such as a flash card or magnetic disk drive. Statically configured information in the FDB can be stored in permanent storage so that when power is cycled to the switch, this configuration information is retained until removed by a network administrator. Switch 610 further has dynamic storage capabilities, for example, a Random Access Memory, in which at least a portion, if not all, of the FDB is maintained when the switch is in operation, so that relatively fast access is provided to the FDB.

Figure 5:
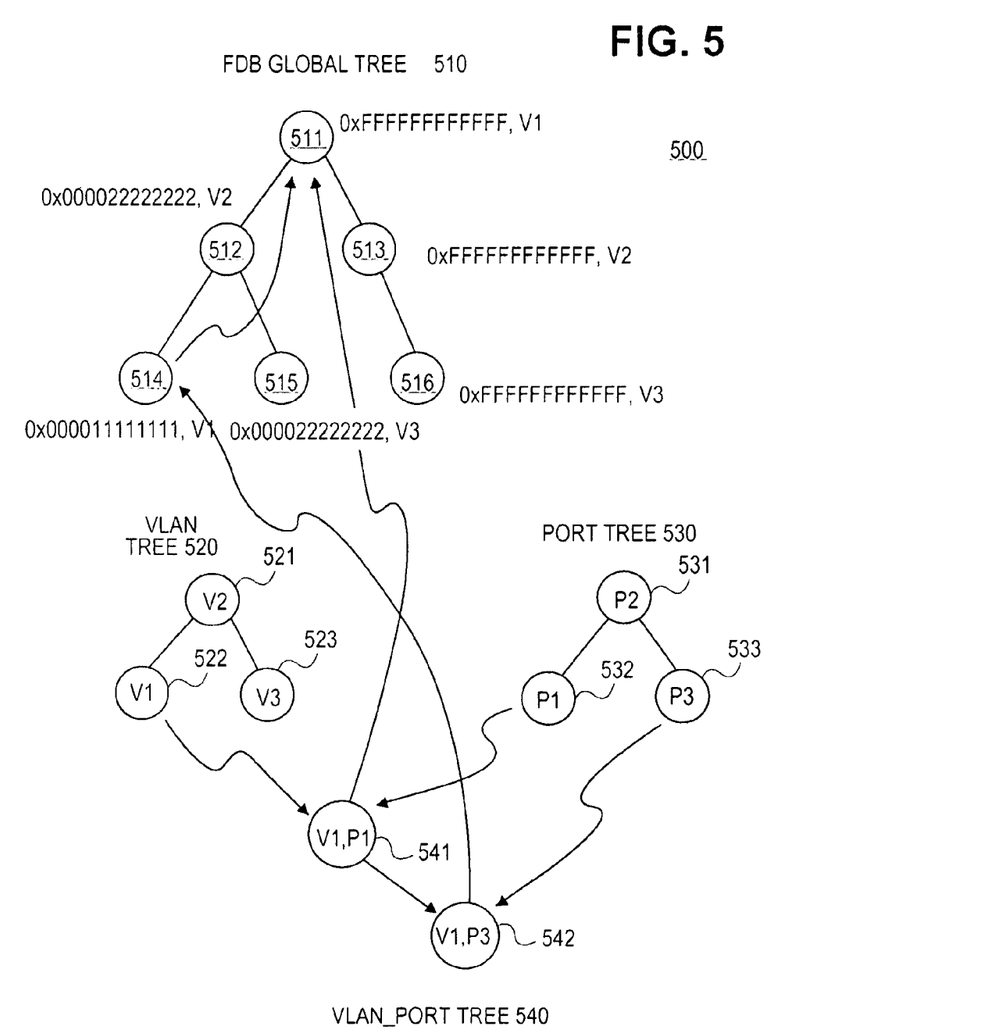
FIG. 5 illustrates the relationship among the VLAN tree, port tree, and VLAN/port tree data structures, as well as with the forwarding database in a network switching device in accordance with one embodiment of the invention.

In one embodiment of the invention, FDB 100 is structured as a graph or tree data structure, for example, a global balanced tree, or skip list, an abstract figure of which is illustrated at 510 in FIG. 5. FDB 100 typically maintains MAC addresses 110 learned during switch operation (dynamic entries) or configured by a network administrator (static entries) in separate entries in the FDB, e.g., 111, 112. In addition, FDB 100 stores a VLAN instance in each entry, if specified, for example, in the header portion of a layer-2 MAC data packet, or by a network administrator. Port information 130 identifies the port(s) via which the node(s) assigned the MAC address can be reached. For example, with reference to FIGS. 1 and 6, the first entry 111 in FDB 100 represents the broadcast MAC address and associated VLAN via which nodes N1 and N3 can be reached via respective ports P1 and P3. Similarly, entry 112 lists the unicast MAC address (0x000011111111(h)), VLAN instance (V1), and switch port P3 via which node N3 is reachable. Entry 112 may be dynamically learned, that is, inserted into FBD 100, when switch 610 receives its first data packet sourced from N3. In one embodiment of the invention, each FDB entry can contain both static information and dynamic information.

Both the MAC address and VLAN instance may be used as keys to search FDB 100. FIG. 5 illustrates in abstract form a FDB structured as a global balanced tree, indexed by the MAC address and VLAN instances. Leaf node 514, for example, corresponds to an entry created in FDB 100 when switch 610 receives a data packet sourced by node N3, in which data packet N3 specifies a VLAN tag for VLAN V1. Root node 511 corresponds to a static entry created in FDB 100 by a network administrator to indicate the broadcast MAC address for node N3 in VLAN V1.

Figure 2:
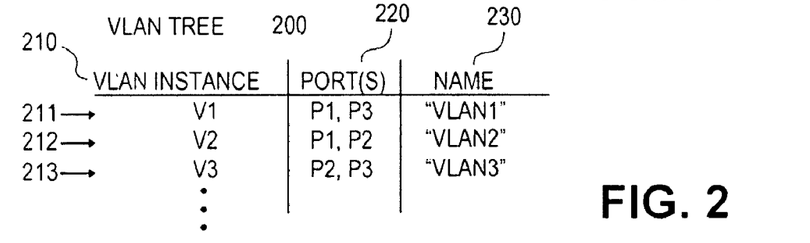
FIG. 2 illustrates a VLAN tree data structure in a network switching device in accordance with one embodiment of the invention.

With reference to FIGS. 2 and 5, in one embodiment of the invention, information relating to VLANs configured in switch 610 for network 600 is maintained in datastore 200 that is structured as a graph or tree 520, for example, a global balanced tree. Each node 521-523 in the tree represents a VLAN and contains data relating to the VLAN, such as the switch ports it encompasses, that is, on which the VLAN is configured, the name of the VLAN, name and contact of a subscriber to a VLAN, etc. Datastore 200 includes, for example, entry 211 that specifies VLAN instance V1 configured on switch ports P1 and P3 in the simple network shown in FIG. 6. Entry 211 in datastore 200 corresponds to leaf node 522 in abstract graph 520. Likewise, VLAN tree datastore entries 212 and 213 respectively correspond to nodes 521 and 523 in VLAN tree graph 520.

Figure 4:
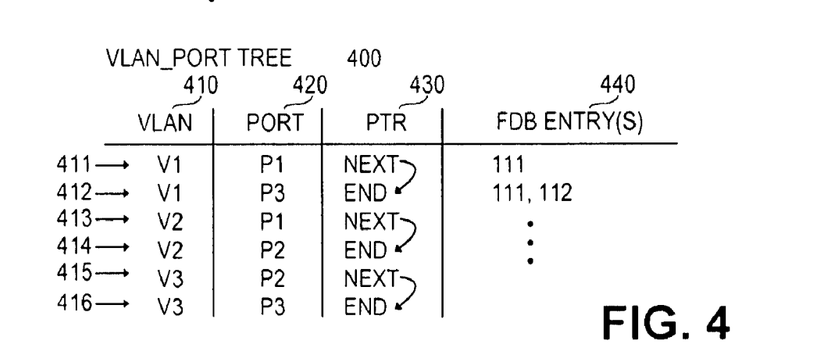
FIG. 4 illustrates a VLAN/port tree data structure in a network switching device in accordance with one embodiment of the invention.

Each VLAN node in tree 520 points to another data structure that maintains a list of the physical ports configured in switch 610 for the VLAN instance specified in the VLAN node. This additional data structure, referred to herein as a VLAN_port tree 400, is illustrated in FIG. 4. VLAN_port tree 540 representing VLAN_port tree 400 is illustrated in FIG. 5. Values stored in field 220 of VLAN tree 200, in one embodiment of the invention, indirectly specify the port(s) associated with a VLAN instance. These indirect values are pointers, that is, memory addresses, to entries in VLAN_port tree 400, where the actual physical port numbers are maintained. For example, entry 211 in VLAN tree 200 specifies pointers in field 220 to entries 411 and 412 in VLAN_port tree 400, which entries store values indicating physical ports P1 and P3 are associated with VLAN instance V1. In FIG. 5, entry 211 corresponds to leaf node 522 in the graph of VLAN tree 520. Leaf node 522, and in particular, a pointer value(s) stored in leaf node 522, in turn, points to nodes 541 and 542 in the graph of VLAN_port tree 540.

Figure 3:
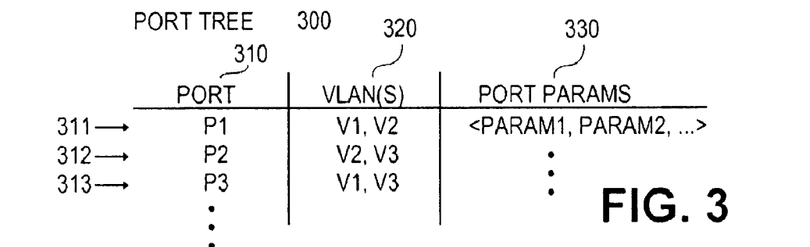
FIG. 3 illustrates a port tree data structure in a network switching device in accordance with one embodiment of the invention.

With reference to FIGS. 3 and 5, in one embodiment of the invention, information relating to ports in switch 610 is maintained in datastore 300 that is structured as a graph or tree ("port tree") 530, for example, a global balanced tree. Each node 531-533 in the tree represents a physical port and contains data relating to the port and its configuration, such as the VLAN(s) with which the port is associated, and other parameters for the port, such as speed, link state, etc. Datastore 300 includes, for example, entry 311 that indicates port P1 is configured as a member of VLANs V1 and V2 in network

600. Entry 311 corresponds to leaf node 532 in abstract graph 530. Likewise, port tree datastore entries 312 and 313 respectively correspond to nodes 531 and 533 in the graph 530 of port tree 300.

Each node (port) in port tree 530 points to another data structure that maintains a list of the VLANs configured in switch 610 associated with the port. In one embodiment, this data structure is the VLAN_port tree 400 illustrated in FIG. 4 and at 540 in FIG. 5. Values stored in field 320 of port tree 300, in one embodiment of the invention, indirectly specify the VLAN(s) associated with a port. These indirect values are pointers to entries in VLAN_port tree 400, where values indicating the VLAN instances are maintained. For example, entry 311 in port tree 300 stores pointers in field 320 that point to entries 411-414 in VLAN_port tree 400, which entries store values indicating VLAN instance V1 is configured to encompass physical ports P1 and P3, and V2 is configured to include physical ports P1 and P2. In FIG. 5, entry 311 corresponds to leaf node 532 in the graph of port tree 530. Pointer values stored in leaf node 532, in turn, point to nodes in graph 540. For example, node 532 in graph 530 points to node 541 in graph 540, representing the association of VLAN V1 with port P1. (The association of port P1 with VLAN V2 is not shown)

As indicated above, in one embodiment of the invention, each node in port tree 530 points to the VLAN_port tree 400 illustrated in FIG. 4 and at 540 in FIG. 5. VLAN_port tree, as described above, is the same data structure pointed to by VLAN tree 520 as well. However, in another embodiment of the invention, port tree 530 points to a different data structure, for example, a port_VLAN tree (not illustrated). Just as in the first described embodiment, values stored in field 320 of port tree 300 indirectly specify the VLAN(s) associated with a port. However, these indirect values are pointers to entries in a port_VLAN tree data structure, where values indicating the VLAN instances are maintained. For example, entry 311 in port tree 300 stores pointers in field 320 that point to entries in a port_VLAN tree, which entries store values indicating VLAN instance V1 is configured to encompass physical ports P1 and P3, and V2 is configured to include physical ports P1 and P2. In this alternative embodiment, each entry in a port_VLAN tree is related to a corresponding node in the VLAN_port tree, and each pair of such corresponding nodes is treated and essentially can be accessed as a single node in either the VLAN_port tree or the port_VLAN tree.

In either embodiment of the invention, whether a node in VLAN tree 520 and a node in port tree 530 each maintain pointers to nodes in respectively separate associated VLAN_port or port_VLAN tree data structures, or whether the nodes in trees 520 and 530 point to a common node in a shared VLAN/port tree data structure, every node in the tree data structure, for example, every node in VLAN_port tree 540, includes a linked list or the like of other nodes in the data structure that belong to the same VLAN instance or physical port. For example, with reference to FIG. 4, a pointer value 430 links VLAN_port tree entry 411 to entry 412, which corresponds to the link between nodes 541 and 542 in the graph 540 of VLAN_port tree in FIG. 5, indicating ports P1 and P3 are members of VLAN V1. A second pointer value (not shown) links VLAN_port tree entry 411 to 413, indicating VLANs V1 and V2 are configured on port P1. In one embodiment, the second pointer value in maintained in a separate but corresponding node in the port_VLAN tree discussed above.

Importantly, each node in the linked list, or each pair of corresponding nodes in the linked list, as the case may be depending on the embodiment of the invention, contains an additional pointer(s) to an entry(s) in the FDB 100. For example, entry 411 and 412 are members of a linked list, as indicated by the pointer 430 in entry 411, and as illustrated in graph 540 of FIG. 5. In FIG. 4, the first entry 411 in the linked list includes a pointer in field 440 to entry 111 in FDB tree 100. The second entry 412 in the linked list (and last entry in this example as indicated by the pointer value in field 430 of entry 412) includes a pointer in field 440 to entry 111 in FDB tree 100, and another pointer in field 440 to entry 112 in FDB tree 100. These entries and their pointer values in field 440 are graphically illustrated in FIG. 5, in which the first node 541 in the linked list includes a pointer to node 511 in the FDB tree 510, and the second node 542 in the linked list includes a pointer to node 514, which in turn, includes a pointer to node 511. While in the graphical illustration, node 542 only includes a pointer to node 514, and node 514 in turn, includes a pointer to node 511, is appreciated that a node 542 can maintain multiple pointers to FDB entries in field 440 of VLAN_port tree 400 rather than maintaining only the head pointer to a linked list as shown in FIG. 5.

Using the data structures described above, and referenced in FIGS. 1-5, the FDB in network switch 610 can be managed and operate more quickly and efficiently to forward and filter data traffic. FDB entries can be added or removed, on the basis of MAC address, VLAN instance, or port number value, as described more fully below.

Adding a FDB Entry

Figure 7:
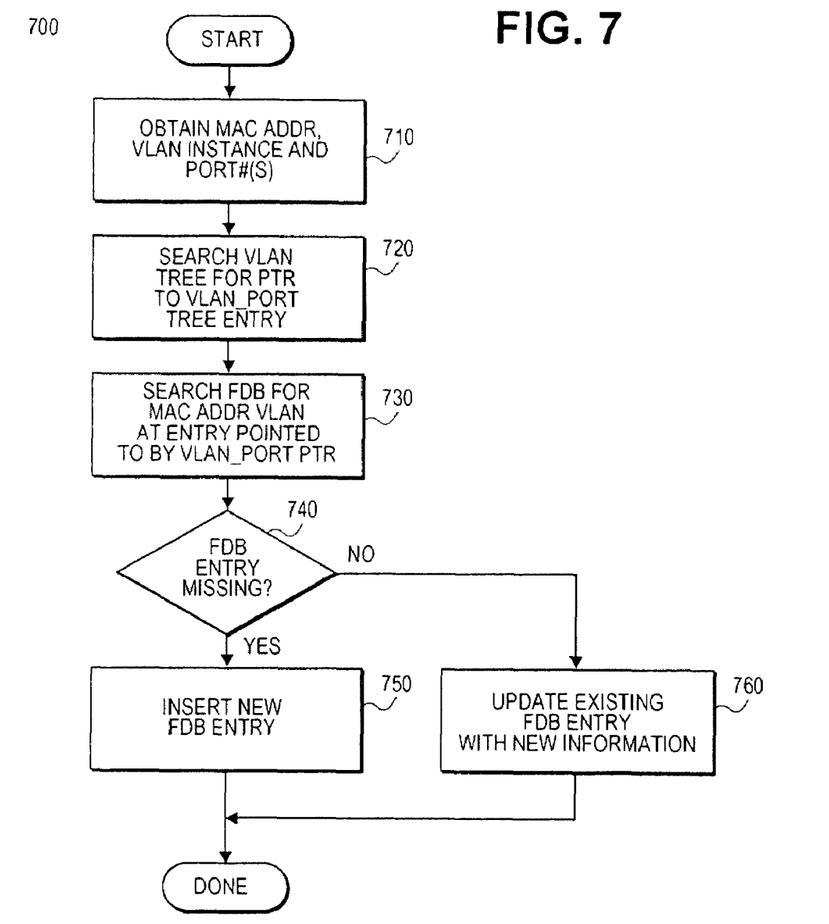
FIG. 7 is a flow diagram of an embodiment of the invention.

With reference to FIG. 7, a flow diagram 700 of computer implemented algorithm for adding a new entry the FDB tree is provided. At least a MAC address, VLAN instance, and port is obtained at 710, whether by virtue of receiving a data packet at a port of switch 610, or from a network administrator providing input to configure a static entry in the FDB. Using the VLAN instance as a key, the VLAN 200 tree is first searched for a matching entry at 720. If found, the corresponding port field 220 contains a pointer to an entry in VLAN_port tree 400. The FDB field 440 of the entry in the VLAN_port tree contains a pointer to at least one entry in the FBD tree 100. Next, at 730, the FDB tree is searched using the MAC address and VLAN instance as keys, starting at the entry pointed to by pointer in the VLAN_port FDB field 440, and following to other entries pointed to by the pointer in VLAN_port FDB field 440, whether directly or in a linked list, the head of which is pointed to by the pointer in VLAN_port FDB field 440. If the FDB entry does not exist at 740, a new FDB entry is inserted into the FDB at 750. This same process is followed in an existing FDB entry is being updated at 760 with new information to ensure its accuracy. For example, if the entry to be updated is a dynamic (learned) entry, then the existing dynamic entry is removed, and corresponding entry information and timer (aging) information is updated. If the new entry is a static entry, then the new static information is inserted into a static port list in the FDB entry.

Removing FDB Entries Associated with a Given VLAN Instance and/or Port

Removing a FDB entry based on MAC address and VLAN instance can be done simply by using a MAC address and a VLAN instance as keys to search for the entry in the global FDB data structure 100, and if found, remove the FDB entry. However, directly manipulating the FBD using other values as keys, such as VLAN instance and/or port numbers, presents a problem since the FDB uses the VLAN instance and MAC address as key fields, not other fields.

Figure 8:
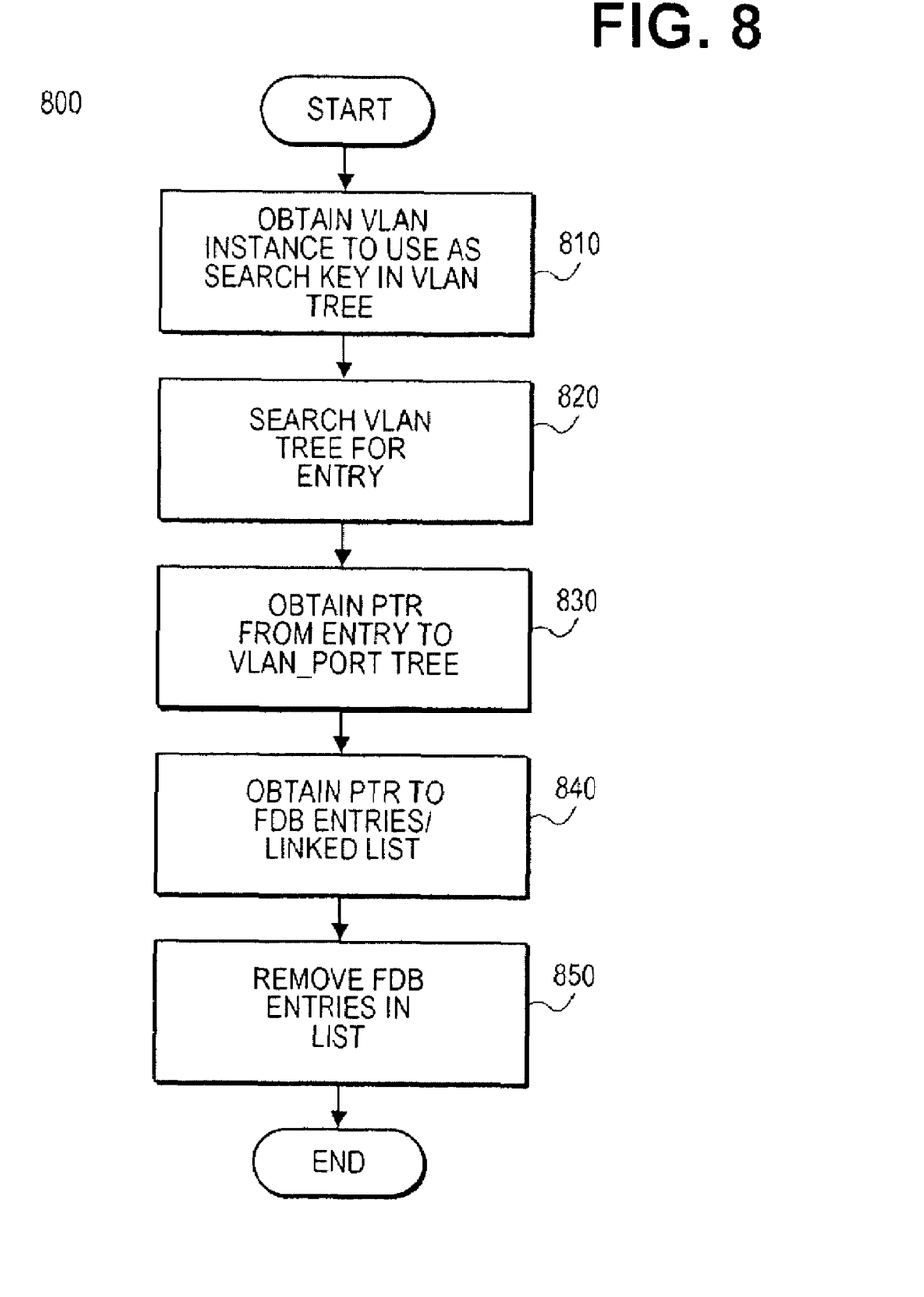
FIG. 8 is a flow diagram of an embodiment of the invention.

With reference to FIG. 8, a flow diagram 800 of a computer implemented algorithm for removing all FDB entries associated with a VLAN instance and port is provided. As an initial step, obtain a VLAN instance to use as a search key, for example, as input from a network administrator, at 810, and search the VLAN tree 200 for an entry that matches the VLAN instance at 820. At 830, obtain the corresponding value from the port field 220 to use as a pointer to an entry in the VLAN_port tree 400. Obtain the value from the FDB entry field of the entry in the VLAN_Port tree at 840, and use the same as a pointer to an FDB entry or, as discussed above, an FDB entry link list, then remove every FDB entry in the list at 850.

For example, to remove an FDB entry associated with VLAN V1 and port P1, obtain at 810 the VLAN instance V1 to use as a search key, and search at 820 the VLAN tree 200 for the entry 211 that matches the VLAN instance. At 830, obtain the corresponding value P1 from port field 220 to use as a pointer to an entry 411 in the VLAN_port tree 400. Obtain the value ("111") from the FDB entry field 440 of the entry in the VLAN_Port tree at 840, and use the same as a pointer to an FDB entry 111 or, as discussed above, an FDB entry link list, then remove every FDB entry in the list at 850.

This same process can be used to remove all FDB entries associated with a given VLAN, or with a given port. For example, to remove all FDB entries associated with a given VLAN, perform the operations illustrated in the flow diagram of FIG. 8, except that at 830, instead of simply obtaining the value P1 from port field 220 to use as a pointer to the entry 411 in the VLAN_port tree, obtain the values P1 and P3 from port field 220 to use as pointers to the respective entries 411 and 412 in the VLAN_port tree for all (both) ports. The pointers in FDB entry field 440 are used as pointers to FDB entries 111 and 112. These FDB entries are removed from FDB tree 100.

To remove all FDB entries associated with a given port, perform the process set forth in FIG. 8, using a port number as the key, and searching the port tree rather than the VLAN tree. For every VLAN associated with the port, remove the FDB entries as discussed above. For example, to remove all FDB entries associated with port P3, search port tree 300 using P3 as the key. Entry 313 in port tree 300 matches the search key. The values V1 and V3 in the VLAN field of entry 313 are used as pointers to respective entries 412 and 416 in VLAN_port tree 400, and the pointers in the FDB entry field 440 that correspond to entries 412 and 416 are used as pointers to FDB entries, which are then removed from FDB tree 100.

It should be noted that reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented, for example, in terms of algorithms and symbolic representations of operations on data within a computer memory. These algorithmic descriptions and representations are the means used by those skilled in the data processing arts to most effectively convey the substance of their work to others skilled in the art.

An algorithm is herein, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as binary digits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general-purpose computer selectively activated or reconfigured by a computer program stored in the computer. Such a computer program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. In addition, the present invention is not described with reference to any particular programming language. It will be appreciated that a variety of programming languages may be used to implement the teachings of the invention as described herein.

What is claimed is:

1. An apparatus, comprising:
    a storage medium that stores
        a packet forwarding database structured as a graph of nodes (graph of FDB nodes), each FDB node including a media access control (MAC) address, a Virtual Local Area Network (VLAN) instance identifier, and an egress port number,
        a first graph of VLAN nodes, wherein each VLAN node includes a respective VLAN instance identifier and a respective pointer to a first graph of port nodes associated with the VLAN instance identifier, and
        a second graph of port nodes, wherein each port node includes a port number and a pointer to a second graph of VLAN nodes associated with the port number, wherein each port node in the first graph of port nodes is paired with a corresponding VLAN node in the second graph of VLAN nodes, and each pair of port node and VLAN node includes a pointer to an FDB node with a corresponding VLAN instance identifier and egress port number;
    means for obtaining a VLAN instance identifier as a first search key;
    means for obtaining a port number as a second search key; and
    means to manipulate the packet forwarding database given one of the first search key with which to search the first graph of VLAN nodes and a second search key with which to search the second graph of port nodes.

2. The apparatus of claim 1, wherein the means to manipulate the packet forwarding database given the first search key comprises means to add an entry to the packet forwarding database given the first search key with which to search the first graph of VLAN nodes.

3. The apparatus of claim 1, wherein the means to manipulate the packet forwarding database given the second search key comprises means to remove an entry from the packet forwarding database given the first search key with which to search the first graph of VLAN nodes.

4. The apparatus of claim 1, wherein the means to manipulate the packet forwarding database given the second search key comprises means to remove an entry from the packet forwarding database given the second search key with which to search the second graph of port nodes.

5. An apparatus, comprising:
a storage medium that stores
a graph of nodes, each node including a media access control (MAC) address, a Virtual Local Area Network (VLAN) instance identifier, and an egress port number, and
a graph of VLAN nodes, wherein each VLAN node includes a respective VLAN instance identifier and a respective pointer to a graph of port nodes associated with the VLAN instance identifier, wherein each port node includes a pointer to a node in the graph of nodes with a corresponding VLAN instance identifier and egress port number, wherein a first port node in the graph of port nodes further includes a pointer pointing to a second port node in the graph of port nodes;
means for obtaining a VLAN instance identifier as a search key with which to search the graph of VLAN nodes; and
means to manipulate the graph of nodes given the search key, including
means for searching the graph of VLAN nodes based on the search key to identify the first port node of the graph of port nodes,
means, responsive to the identifying the first port node, for identifying from the first port node of the graph of port nodes a first search point of the graph of nodes,
means, responsive to the identifying the first port node, for identifying the second port node based on the pointer of the first port node pointing to the second port node, and
means, responsive to the identifying the second port node, for identifying from the second port node a second search point of the graph of nodes.

6. The apparatus of claim 5, wherein the means to manipulate the graph of nodes given the search key adds a node to the graph of nodes given the search key.

7. A network switch comprising:
a data storage medium comprising a first, second and third data structure, the first data structure including a node comprising a VLAN instance identifier and a pointer to a node in the second data structure, the node in the second data structure comprising a port number associated with the VLAN instance identifier in the node in the first data structure, and a pointer to a node in the third data structure, the node in the third data structure comprising a MAC address, VLAN instance identifier and egress port; and
means for obtaining a first key,
means for searching the first data structure for the node comprising the VLAN instance identifier that matches the first key;
means for obtaining from the node in the first data structure the pointer to the node in the second data structure if the node in the first data structure comprises the VLAN instance identifier that matches the first key;
means for obtaining from the node in the second data structure pointed to by the pointer in the node in the first data structure the pointer to the third data structure; and
means for accessing the node in the third data structure pointed to by the pointer in the node in the second data structure.

8. The network switch of claim 7, wherein the node in the third data structure comprises a linked list of other nodes in the third data structure, the linked list including pointers to the other nodes in the third data structure; wherein the network switch further comprises:
means for traversing the linked list of other nodes; and
means for accessing the other nodes in the third data structure pointed to by the pointers in the linked list.

9. A network switch comprising:
a data storage medium comprising a first, second and third data structure, the first data structure including a node comprising a port number and a pointer to a node in the second data structure, the node in the second data structure comprising a VLAN instance identifier associated with the port number in the node in the first data structure, and a pointer to a node in the third data structure, the node in the third data structure comprising a MAC address, VLAN instance identifier and egress port; and
means for obtaining a first key,
means for searching the first data structure for the node comprising the port number that matches the first key;
means for obtaining from the node in the first data structure the pointer to the node in the second data structure if the node in the first data structure comprises the port number that matches the first key;
means for obtaining from the node in the second data structure pointed to by the pointer in the node in the first data structure the pointer to the third data structure; and
means for accessing the node in the third data structure pointed to by the pointer in the node in the second data structure.

10. A method for adding an entry to a forwarding database in a network switch, comprising:
obtaining a MAC address, VLAN instance identifier, and port number;
searching a VLAN tree of VLAN nodes to find an entry that matches the VLAN instance identifier, wherein each VLAN node includes a VLAN instance identifier and a pointer to a VLAN_port tree of port nodes;
based on the searching the VLAN tree, identifying a VLAN node including the matching entry, the identified VLAN node including a pointer to a first port node of a VLAN_port tree of port nodes, the first port node including a pointer to the forwarding database and a pointer to a second port node of the VLAN port tree;
responsive to the identifying the VLAN node, identifying from the first port node of the VLAN_port tree a first search point of the forwarding database;
responsive to the identifying the first port node, identifying the second port node based on the pointer of the first port node pointing to the second port node;
responsive to the identifying the second port node, identifying from the second port node a second search point of the forwarding database;
searching for an entry in the forwarding database using the MAC address and VLAN instance identifier as keys, starting at the first search point of the forwarding database and proceeding to the second search point of the forwarding database; and if the forwarding database entry is not found, insert a new forwarding database entry.

11. The method of claim 10, wherein obtaining a MAC address, VLAN instance identifier, and port number comprises receiving a data packet at a port of the network switch and reading therefrom the MAC address and VLAN instance identifier.

12. The method of claim 10, wherein obtaining a MAC address, VLAN instance identifier, and port number comprises receiving user input providing the MAC address and VLAN instance identifier to associate with a physical port of the network switch configured with the port number.

13. A computer readable medium encoded with instructions capable of being executed by a computer to perform a method to remove forwarding database entries associated with a VLAN instance and network switch port, the method comprising:

obtaining a VLAN instance identifier to use as a search key;

based on the search key, searching a VLAN tree of VLAN nodes to find an entry that matches the VLAN instance identifier, wherein each VLAN node includes a VLAN instance identifier and a pointer to a VLAN_port tree of port nodes;

based on the searching the VLAN tree, identifying a VLAN node including the matching entry, the identified VLAN node including a pointer to a first port node of a VLAN_port tree of port nodes, the first port node including a pointer to the forwarding database and a pointer to a second port node of the VLAN_port tree;

responsive to the identifying the VLAN node, identifying from the first port node of the VLAN_port tree a first entry of the forwarding database;

responsive to the identifying the first port node, identifying the second port node based on the pointer of the first port node pointing to the second port node;

responsive to the identifying the second port node, identifying from the second port node a second entry of the forwarding database; and removing from the forwarding database the first entry and the second entry.

14. A computer readable medium encoded with instructions capable of being executed by a network switch to cause the network switch to perform the method recited in claim 10.

15. A computer readable medium encoded with instructions capable of being executed by a network switch to cause the network switch to perform the method recited in claim 11.

\* \* \* \* \*

UNITED STATES PATENT AND TRADEMARK OFFICE
CERTIFICATE OF CORRECTION

PATENT NO. : 7,646,773 B2  Page 1 of 1
APPLICATION NO. : 10/911156
DATED : January 12, 2010
INVENTOR(S) : Na et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1560 days.

Signed and Sealed this

Twenty-eighth Day of December, 2010

David J. Kappos
*Director of the United States Patent and Trademark Office*